United States Patent [19]

Castro et al.

[11] Patent Number: 4,625,079

[45] Date of Patent: Nov. 25, 1986

[54] METHOD AND APPARATUS FOR ACTIVATING THROUGH PHONE TELECOMMAND AN ANNOUNCER-RECORDER, AND FOR SELECTIVELY ACTIVATING THROUGH THE SENDING OF CODES CONSISTING OF SIGNALS AT LEAST ANOTHER AUTOMATIC CALL ATTENTION PHONE DEVICE

[76] Inventors: Horacio Castro; Marcelo Castro, both of El Salvador 5962, Buenos Aires 1414, Argentina

[21] Appl. No.: 491,812

[22] Filed: May 5, 1983

Related U.S. Application Data

[63] Continuation-in-part of Ser. No. 288,812, Jul. 31, 1981, Pat. No. 4,387,272.

[51] Int. Cl.$^4$ .............................................. H04M 1/64
[52] U.S. Cl. ........................................ 379/77; 379/88; 379/211
[58] Field of Search ................... 179/6.01, 6.07, 6.03, 179/6.11, 6.16, 6.15

[56] References Cited

U.S. PATENT DOCUMENTS

| | | | |
|---|---|---|---|
| 3,784,721 | 1/1974 | Kilby | 179/6.07 |
| 3,793,487 | 2/1974 | Kilby | 179/6.07 |
| 4,031,323 | 6/1977 | Ando et al. | 179/6.11 |
| 4,192,971 | 3/1980 | Morigami et al. | 179/6.11 |
| 4,387,272 | 6/1983 | Castro et al. | 179/6.11 |

*Primary Examiner*—Robert L. Richardson
*Attorney, Agent, or Firm*—Fleit, Jacobson, Cohn & Price

[57] ABSTRACT

The method and apparatus activates, through phone telecommand, an announcer recorder and selectively activates by sending codes at least another automatic call attention phone device to facilitate the remote control of several fixtures located at a phone subscriber's address. The method includes: (A) sending from the calling end of a phone line the characters corresponding to the called phone number; (B) detecting at the called end of the phone line the call trains coming from the phone exchange; (C) closing the d.c. current or conversation circuit over the phone line and coupling thereto a voice synthesizer with a stored announcement inviting the calling party to send a certain code in case he wishes to leave a recorded message; (D) once the code is sent by the calling party, decoding it at the called party's end and, if from the comparison with the code stored in a memory both codes prove to coincide, generating artificial call trains designated to activates a phone answering machine; (E) simultaneously sending, to the calling party, ring back signals intended to advise him that the sent code has been validated and that a phone answering machine is being activated; (F) once the phone answering machine is activated, the calling party's message is recorded; (G) simultaneously with the initiation of stage (F), sending a reset pulse to the phone telecommanded activation device; and finally (H) once step (F) is finished, disconnecting the phone answering machine from the phone line. The apparatus includes devices to carry out the method. Additionally, the calling party can send further codes to activate further devices under remote telecommand control.

10 Claims, 3 Drawing Figures

FIG. 3

METHOD AND APPARATUS FOR ACTIVATING THROUGH PHONE TELECOMMAND AN ANNOUNCER-RECORDER, AND FOR SELECTIVELY ACTIVATING THROUGH THE SENDING OF CODES CONSISTING OF SIGNALS AT LEAST ANOTHER AUTOMATIC CALL ATTENTION PHONE DEVICE

CROSS REFERENCE TO RELATED APPLICATION

This application is a continuation-in-part of copending application Ser. No. 288,812, filed July 31, 1981, and now U.S. Pat. No. 4,387,272.

SUMMARY OF THE DISCLOSURE

This invention relates to a method for activating through phone telecommand an announcer-recorder, and for selectively activating, through the sending of codes consisting of signals, at least another automatic call attention phone device intended to telecommand or remotely control fixtures located at a phone subscriber's address.

The invention also comprises an apparatus to carry out into practice said method.

BACKGROUND OF THE INVENTION

Several patents have been allowed in the field of telephone controls and other remotely controlled devices.

The apparatuses or devices described in said patents have phone call trains detector systems that automatically attend to the called phone line, close the phone loop (thus establishing the d.c. current or conversation circuit) and utilize several successive coding and decoding stages to perform different functions through remote control.

Most of the apparatuses patented up to now, when automatically attending phone calls, emit a distinctive signal advising the calling party to send signals or codes which are in general of a restrictive or exclusive nature. This circumstance results in the fact that calling parties unfamiliar with those systems become upset when the automatic call attention takes place, preventing them from establishing a normal phone communication as they wished to do.

A similar frustration is suffered by calling parties any time their phone calls are attended (after being charged for) by an automatic call attention device announcing to them that they are in communication with a remotely controlled apparatus which can only be activated through the sending of codes unknown to the calling party. Of course, such a calling party has no other chance but to give up the phone call.

On the other hand, anybody wishing until now to install more than one automatic call attention phone device, can only couple one piece of equipment at a time to his phone line.

Likewise, it must be kept in mind that most owners of equipment activated by phone remote controls do not wish calling parties not having been previously informed by the owners to know that such an equipment is installed to the phone or how such equipment works.

The aim of this invention, —in its different variants—, is that of solving the aforementioned problems, allowing any calling party, —familiar or unfamiliar with the operation of equipments designed by phone remote controls, to be attended by equipments not offering the drawbacks mentioned in the foregoing paragraphs.

FIELD OF THE INVENTION

This invention belongs to phone communication art and, more specifically, relates to telecommand sent through a phone line to equipments located at a phone subscriber's address.

SUMMARY OF THE INVENTION

The invention comprises a method and apparatus for activating through phone telecommand an announcer recorder and for selectively activating, through the sending of codes consisting of signals at least another automatic call attention phone device to facilitate the remote control of several fixtures located at a phone subscriber's address.

Such method comprises the following stages:

(A) sending from the calling end of a phone line the characters corresponding to the called phone number;

(B) detecting at the called end of the phone line the call trains coming from the phone exchange;

(C) closing the d.c. current or conversation circuit over the phone line and coupling thereto a voice synthesizer with a stored announcement inviting the calling party to send a certain code in case he wishes to leave a recorded message;

(D) once the code is sent by the calling party, decoding it at the called party's end and, if from the comparison with the code stored in a memory both codes coincide, generating artificial call trains destinated to activate a phone answering machine;

(E) simultaneously sending, to the calling party, ring back signals intended to advise him that the send code has been validated and that a phone answering machine is in the activation process;

(F) once the phone answering machine is activated, the calling party's message is recorded;

(G) simultaneoulsy with the initiation of stage (F), sending a reset pulse to the phone telecommanded activation device; and finally (H) once stage (F) is finished, disconnecting, the phone answering machine from the phone line.

Another variant of the method is that wherein, once completed stages (A), (B) and (C) are completed, (D) once said certain code is sent by the calling party, decoding it at the called party's end, and, if from the comparison with the code stored in said memory, both codes coincide, emitting an audible signal over the phone line in order to advise the calling party that he can leave a recorded message;

(E) simultaneously coupling to the phone line a sound recorder;

(F) sending a ring-back signal to the calling party letting him know that recording time is over; and finally (G) sending a reset pulse to the phone telecommanded activation device, de-activating and disconnecting from the phone line said sound recorder.

A third variant of the method is that wherein, once stages (A), (B) and (C) are completed, (D) emitting from the calling party's end a code different from the one announced in stage (C), decoding it at the called party's end and, if from the comparison with other codes stored in said memory, it proves to be one of the stored codes, generating artificial call trains destinated to activate an automatic call attention phone device;

(E) simultaneoulsy sending to the calling party ringback signals to advise him that the sent code has been validated and that an automatic call attention phone device for remote control telecommand is in the activation process;

(F) once the equipment is activated, the calling party sending the corresponding code or codes for activating said automatic call attention phone device;

(G) simultaneoulsy with the initiation of stage (F), sending a reset pulse to the phone telecommanded activation device.

The apparatus intended to carry out into practice the above specified method has a pair of terminals capable of being connected to a phone line and in turn connected to the input of a ring bell or call trains detector having a timer (intended to regulate the detection of a whole number of ringings or call trains), to a first input of at least one phone line coupler transfer switch (intended for connecting a phone answering machine or an automatic call attention phone device), to the input of a phone line polarity reverse, dialling tone or busy tone detector, to the output of a voice synthesizer and to one output of a memory; the output of said ring bell or call trains detector—with timer—connected to a first input of a d.c. current closing or attention circuit and this latter with a first output connected to the input of said voice synthesizer and a second output connected to the input of a decoder; said decoder with its output connected to the input of said memory; said memory with a first output connected to a second input of said d.c. current closing or attention circuit and with at least another output connected to the input of an artificial call trains generator; the output of said artificial call trains generator connected to a second input of said phone line coupler transfer switch, which has in turn a first output connected to the input of a phone answering machine and a second output connected to said second input of said d.c. current closing or attention circuit; finally said phone line polarity reverse, dialling tone or busy tone detector with its output connected to said second input of said d.c. current closing or attention circuit.

BRIEF DESCRIPTION OF THE DRAWINGS

Finally, FIG. 3 corresponds to the preferred embodiment of FIG. 1.

Throughout the description of the drawings, any time we refer to an apparatus, this is to be considered as the one corresponding to the inventive apparatus. In all cases, the same shall work as an interface between a phone line and an automatic call attention phone device. Such automatic call attention phone device (or devices) are designated to remotely activate any fixture located, e.g., at a phone subscriber's address, and said any fixture (or fixtures) is not part of the present invention. Any time we refer to a phone answering machine (CTA), we specifically refer to a common announcer-recorder.

DETAILED DESCRIPTION OF THE DRAWINGS

The expressions "call trains", "ring bell trains" or "ringings" are being used as synonymous both in the specification and in the corresponding claims.

Figure 1:
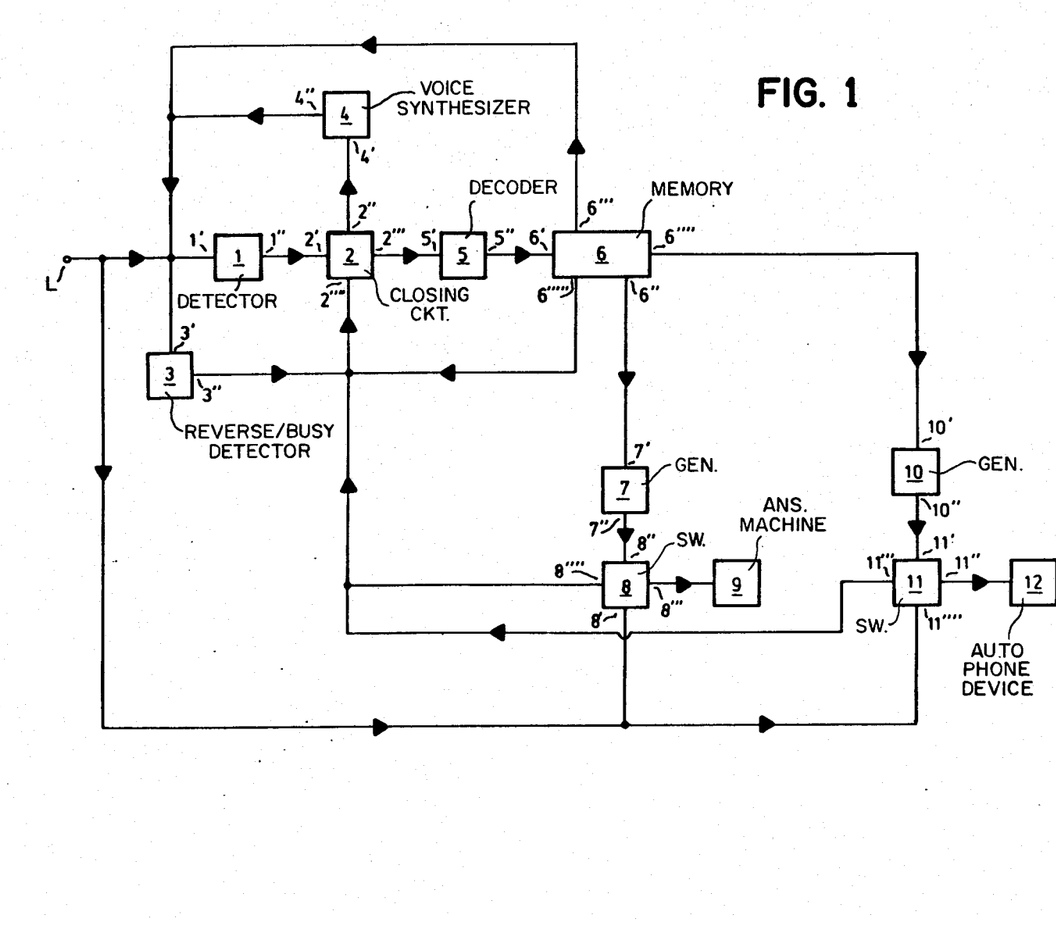
FIG. 1 illustrates a block diagram of the apparatus for carrying out the invention into practice, wherein a phone answering machine and an automatic call attention phone device are being coupled thereto.

In FIG. 1, block 1 is a ring bell trains or call trains detector, said call trains being emitted by the phone exchange; said detector has a timer intended to regulate time and allow the detection of a whole number of said call trains; 2 is a d.c. current closing or conversation circuit; 3 is a phone line polarity reverse detector as well as a dialling tone or busy tone detector; 4 is a synthesized voice announcer plus an acoustic signal generator (a beep) storing a message saying, e.g.: "If you want to leave a message, dial number 2222"—beep—; 5 is a decoder of the signals sent by the calling party in order to command the apparatus functions, signals which may be rotary dial pulses, multifrequencies, Tough-Tone signals, pure tones, phonemes, etc.; 6 is a programmable memory; 7 and 10 are artificial call trains generators; 8 and 11 are transfer switches coupling the phone line to the phone answering machine and to the automatic call attention phone device; 9 is a phone answering machine and, finally, 12 is an automatic call attention phone device, which may also be another phone answering machine.

The phone line is connected to terminal L of the apparatus, to one output of memory 6, to the output of synthesized voice announcer 4, to the input of call trains detector 1, to the input of phone line polarity reverse, dialling tone or busy tone detector 3, and to respective inputs of said phone line coupler transfer switches 8 and 11.

The apparatus works as follows: The calling party dials the characters corresponding to the phone number of the location wherein the apparatus is installed; the call trains coming from the phone exchange enter through input 1' of ring bell or call trains detector 1. Once an "n" number of call trains have entered (according to a programmed whole number), output 1" activates input 2' of the d.c. current closing or conversation circuit 2, making said call trains stop. Simultaneously, output 2" of circuit 2 activates input 4' of synthesized voice announcer 4, which, through its output 4" couples the corresponding announcement to the phone line.

From that moment on, the calling party has at least 15 seconds (adjustable time period) to enter a code consisting of, e.g., four character into the apparatus, said four characters having been announced to him through the message stored in the synthesized voice announcer 4. If the calling party sends the code, this shall be coupled through output 2''' of circuit 2 to input 5' of circuit 5, this latter comprising a signal decoder, as above specified. The signals decoded by 5 are coupled through its output 5" to input 6' of a programmable memory 6. Once accepted or validated the code emitted by the calling party, output 6" of said memory 6 activates input 7' of artificial call trains generator 7, comprising a circuit generating call train pulses of a similar frequency and cadence as those generated at a phone exchange. The call trains generated by 7 are coupled through its output 7" to input 8" of transfer switch 8, which, through its output 8''', couples them to phone answering machine 9. Simultaneously, output 6''' of memory 6 sends to the input of the phone line a ring-back signal of a similar cadence as the one generated by 7 to the end of advising the calling party that his code has been validated and that the phone answering machine 9 is in the activation process.

Upon attending the artificial call generated by 7, phone answering machine 9 shall close its d.c. current circuit; this function shall be detected by transfer switch 8, which, through its input 8' and its output 8''', shall couple the phone line to said phone answering machine 9, the calling party remaining in communication with this latter. Simultaneously, output 8'''' of transfer switch 8 shall send a reset pulse to input 2'''' of automatic call attention phone device 2, this latter being thus disconnected from the phone line, that is to say, the apparatus shall get disconnected from the phone line as long as the calling party is holding the communication with the phone answering machine.

The described process aims to demonstrate how can the apparatus attend a calling party who does not know the system connected over the phone line.

We shall see now the case wherein the calling party is the owner of the apparatus connected on the phone line or else a calling party wishing only to activate the automatic call attention phone device 12 to the end of performing some specific function which the equipment is intended for. It must be borne in mind that 12 may also be another phone answering machine, but with an access code restricted to certain persons or else with just one code only known to the apparatus' owner. It can be seen in the circuit diagram that blocks 10, 11 and 12 have the same connections as blocks 7, 8 and 9, a reason why we shall not repeat the operative process allowing in this case the calling party to establish a communication or to activate the automatic call attention phone device. The apparatus has been described for those cases wherein it is correctly activated by the calling party. Let's see those cases wherein the calling party performs operations different from the previously described ones. If the calling party does not send all the characters or fails to complete the code or codes programmed in memory 6 within the above mentioned time of, e.g. 15 seconds, output 6''''' of said memory 6 shall send a disconnect or reset pulse to device 2, thus disconnecting the apparatus from the phone line. The same process shall take place if the calling party sends no character or tries to enter into memory 6 codes not being validated in this latter.

A disconnect device 3 has been introduced in the circuit, intended to detect (at certain phone exchanges) the phone line polarity reverse for those cases wherein the calling party hangs up his handset at any stage of the apparatus operative process. Besides, this device 3 is able to detect the presence of dialling or busy tone in order to perform a disconnect process. In those cases wherein device 3 detects such circumstance, it will send, through its output 3'', a disconnect pulse to device 2, producing the disconnection of the apparatus from the phone line.

The following is a special case of device 3 application: let's suppose that the phone answering machine or the automatic call attention phone device does not answer, for some reason, the call coming from the corresponding generator; this means that the apparatus shall indefinitely call to 9 or 12. It is understood that the calling party not being answered within a reasonable time shall produce upon hanging up his handset the disconnection of the invention apparatus from the phone line and the reset of the same, thus being left the apparatus and the phone line in a position to accept a new call.

In FIG. 1, memory 6 may be a programmable one or not, it may store several codes and, through a compatible number of outputs, it may activate "n" automatic call attention phone devices.

In the practice and according to the needs, said memory 6 may be replaced by individual memories, that is to say, one memory for each code, as shall be seen below in a practical embodiment of this circuit.

Figure 2:
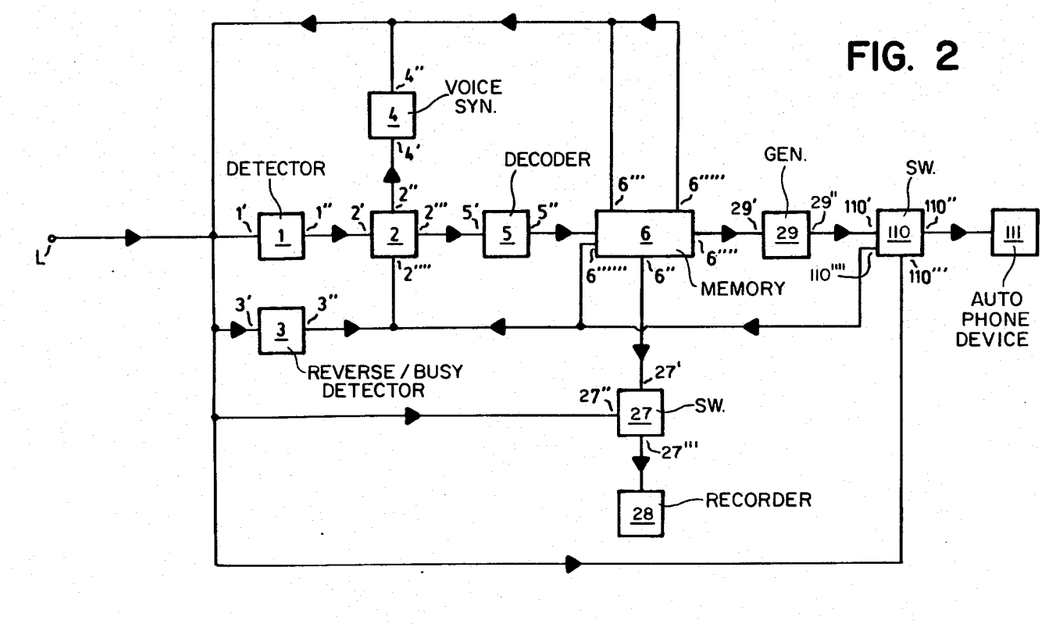
FIG. 2 is similar to FIG. 1, but, instead of a phone answering machine, a sound recorder is used.

In FIG. 2, block 1 corresponds to a ring bell or call trains detector, furnished with a timer intended to regulate time and allow the detection of a whole number of call trains; 2 is a d.c. current closing or conversation circuit; 3 is a phone line polarity reverse detector and also a dialling tone or busy tone detector; 4 is a synthesized voice announcer plus an acoustic signal generator (beep) with a stored message which says, e.g.: "If you want to leave a recorded message, dial number 2222"—beep—; 5 is a signal decoder intended to decode signals sent by the calling party in order to command the apparatus' functions, signals which may be rotary dial pulses, multifrequencies, Touch-Tone signals, pure tones, phonemes, etc.; 6 is a programmable memory; 27 is a switch activating the sound recorder and coupling this latter to the phone line; 28 is a sound recorder; 29 is an artificial call trains generator; 110 is a phone line switch to which an automatic call attention phone device 111 is coupled.

The phone line is connected to terminal L of the apparatus, to the input 1' of call trains detector, to a pair of outputs of programmable memory 6, to output 4'' of synthesyzed voice announcer 4, to input 3' of phone line polarity reverse, dialling tone or busy tone detector 3, to input 27'' of switch 27 activating the sound recorder and coupling this latter to the phone line, and, finally, to the input of phone line coupler transfer switch 110, which connects to the phone line the automatic call attention phone device 111.

The apparatus works as follows: the calling party dials the characters corresponding to the phone number of the location wherein the apparatus is installed; the call trains coming from the exchange enter input 1' of ring bell or call trains detector 1. Once an "n" number of call trains (according to a programmed whole number) have entered, output 1'' activates input 2' of d.c. current closing or attention circuit 2, thus making them stop. Simultaneously, output 2'' of block 2 activates input 4' of synthesized voice announcer 4, which, through its output 4'', couples the corresponding announcement to the phone line.

From that moment on, the calling party has a time of at least 15 seconds (adjustable time) to enter into the apparatus a code consisting of, e.g., four characters, —a code which has been announced to him through the message stored in synthesized voice announcer 4. If the calling party sends the code, this latter shall be coupled through output 2''' of attention circuit 2 to input 5' of decoder 5. The signals decoded by 5 are coupled through its output 5'' to input 6' of programmable memory 6. Once the code sent by the calling party has been validated or accepted in memory 6, this latter, through its output 6''', shall send an audible signal to the phone line; said signal, which shall be received by the calling party, shall advise this latter that he can leave a recorded message. Simultaneously, output 6'' of memory 6 activitates input 27' of the switch activating the sound recorder and coupling this latter to the phone line. The time which the calling party has at his disposal to send his message can be programmed in, e.g., at least 15 seconds, said time being programmed in memory 6. Once the programmed time is over, memory 6 sends through its outut 6''' a new signal, different from the one having been previously sent to the calling party, this new signal being intended to advise the calling party that message recording time is over; subsequently, through its output 6'', memory 6 shall send a de-activation signal to input 27' of circuit 27, which shall uncouple the recorder from the phone line, thus stopping the recorder; simultaneously, output 6''''' of memory 6 shall send to input 2'''' of d.c. current closing or attention circuit a reset pulse or signal, uncoupling the phone line from the apparatus, this latter being left in a position to receive a new call.

What has been explained above is a description of the apparatus operation wherein the calling party is not acquainted with the existence or features thereof: the calling party is given a chance to leave a recorded message by means of the recorded invitation stored in synthesized voice announcer 4.

If the calling party knows that the apparatus is prepared to activate an automatic call attention phone device, regardless of its type or model, and he knows the access code needed to activate said device, he will act in the following way: the calling party is answered by the apparatus and, as in the previous case, he receives an announcement inviting him to leave a message and letting him know the corresponding code; once the announcement is over, if the calling party sends the signals corresponding to the automatic call attention phone device activation code (which is of course a code different from the previous one), memory 6, through its output 6'''', shall activate input 29' of artificial call trains generator 29, —the features of which are the same as those described in FIG. 1, that, through its output 29'' and through input 10' and output 110'' of transfer switch 110, shall reach the automatic call attention phone device 111. Simultaneously, output 6''''' of memory 6 shall couple to the input of the phone line a ring-back signal intended to advise the calling party that the apparatus has correctly decoded the code he has sent and the automatic call attention phone device 111 is in the activation process.

The process of activation, attention and phone line coupling, and reset, is performed in the same way as described for FIG. 1, this present circuit configuration being identical to that illustrated in FIG. 1.

This is also valid as far as circuit 3 (phone line polarity reverse detector) is concerned.

Figure 3:
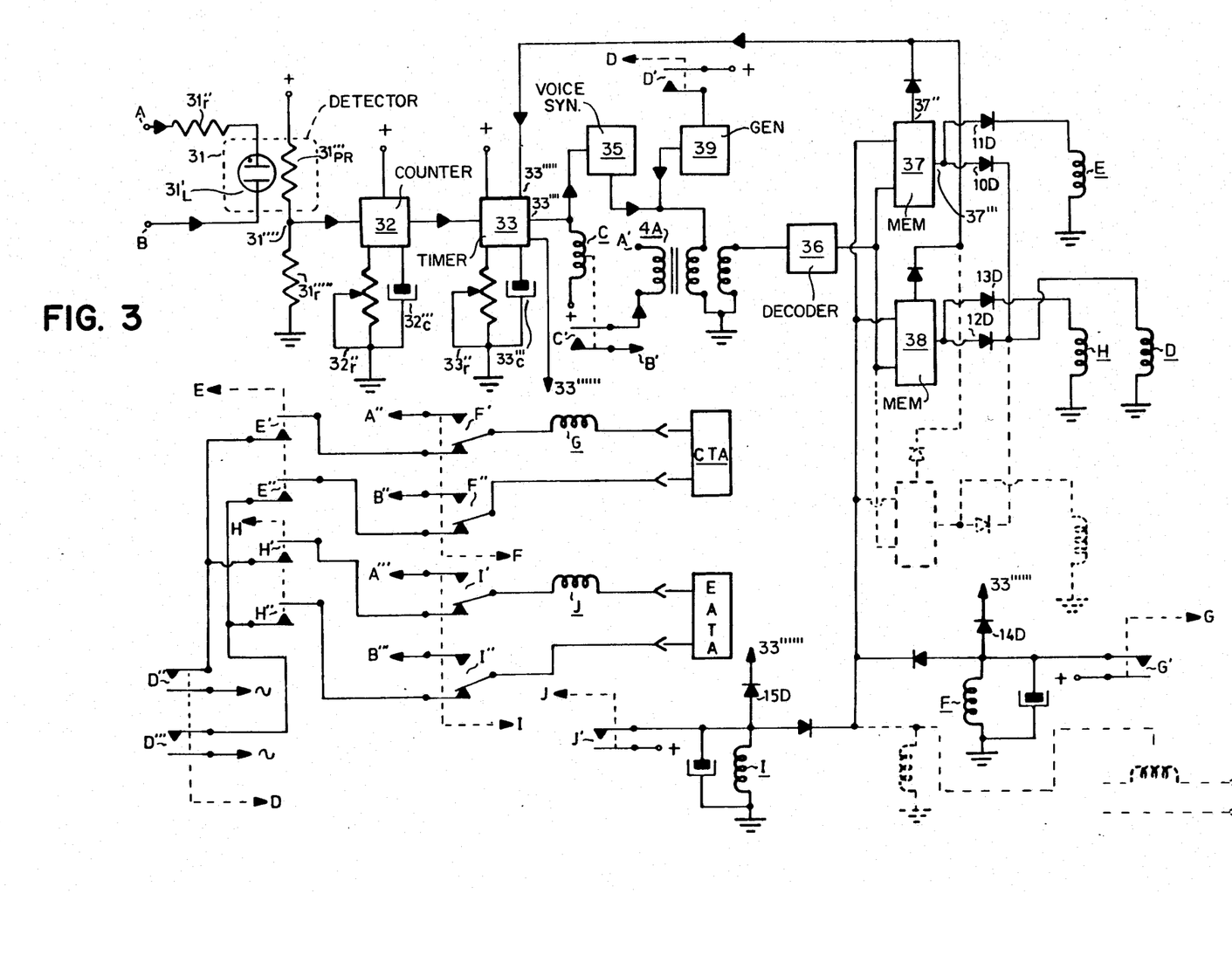

In making a detailed description of FIG. 3, it can be seen in the corresponding circuit arrangement that a phone answering machine CTA and an automatic call attention phone device EATA have been connected to the apparatus. Bearing in mind that both units belong to that type of systems automatically attending the phone line when this latter receives a call from the exchange, it does not matter where those units are connected.

The preferred embodiment of this apparatus allow to activate in a selective way, responding to the will of the calling party who sends the activation code, any automatic call attention phone device, regardless of the output of the apparatus whereto such devices may be connected. Even when the basic aim of the invention is that of allowing to the apparatus owner to connect a phone answering machine (CTA) intended to answer incoming phone calls, it is also possible to connect two automatic call attention phone devices intended to perform remote control functions.

In the diagram, it has been indicated with dotted lines the portion corresponding to an apparatus embodiment having the capacity of selecting and activating "n" automatic call attention phone devices.

As an example, if a user owns an automatic call attention phone device to turn on/off lights, another one to command alarm systems; a third equipment to activate a radio transceiver, etc., he may connect all those equipments to the outputs of the apparatus. An activation code is assigned to each one of the automatic call attention phone devices, whereas the phone answering machine (CTA) activation code is announced by the synthesized voice announcer, saying, e.g.: "If you want to leave a recorded message, dial number 222". In brief, if the calling party is unfamiliar with the system and he wants to leave a recorded message, he dials 2222; if the owner is the one who calls, after hearing the announcement, he shall dial, e.g., number 3333 in order to activate an automatic call attention phone device EATA intended, e.g., to turn on/off the lights.

The main components of the apparatus are the following: 31 is a ring bell or call trains detector, said call trains being emitted by the phone exchange; 32 is a call trains counter programmable for a certain number of call trains or else for a certain time period; 33 is an adjustable timer intended to activate relay C in turn intended to close the d.c. current or attention circuit; 4A is a transformer with a primary having a resistance and impedance similar to those offered by a phone set having its receiver unhooked; 35 is a synthesized voice announcer; 36 is a rotary dial pulses, multifrequencies, Touch-Tone signals, etc., decoder; 37 and 38 are programmable memories; 39 is an audible signals generator, such signals being similar to those generated at a phone exchange and sent to the calling party (ring-backs); C is a relay closing the attention circuit through its contacts C'; D is an artificial call relay, being denominated in this way since it takes care of activating any of the equipments connected to the apparatus, sending them a.c. and d.c. current pulses similar to those sent from the phone exchange through the subscriber's phone line to the called phone set in order to ring its bell; E and H are relays transferring the call from D to the equipment having been selected by the calling party through the sending of a certain code; F and I are the so called transfer relays, since they switch the incoming phone line to the selected automatic call attention phone device, this latter being thus released from the artificial call circuit; finally, G and J are attention detector relays, intended to detect the moment at which the atuomatic call attention phone device attends the artificial call generated by the apparatus in response to a code sent by the calling party. In this embodiment it has been taken into account the fact that programmable memories 37 and 38 may also be fixed memories, plug-in modules intended to allow a change of position for the respective codes, a single memory having capacity for all codes, or else, in a most sophisticated way, a microprocessor for a larger number of functions.

Before describing in detail the embodiment's operation, we must say that outputs A'B'; A'' B'' and A''' B''' are also connected to input terminals A and B, whereto the phone line is connected. If a calling party dials the phone number corresponding to the location where the apparatus is installed, the call trains coming from the phone exchange enter detector 31, turning on gaseous lamp $31_L'$, which is connected in parallel with the phone line through limiter resistor $31_R''$. The light variations emitted by lamp $31_L'$ shall produce in photorresistor $31_{PR}'''$ voltage variations or drops at point $31''''$, junction point between said photorresistor and bias resistor $31'''''$. The signal obtained at $31''''$ is applied to the input of timer 32, which can be programmed either to accumulate an "n" number of call trains or a time of "n" seconds, a program which may be achieved through a convenient election of variable resistor $32''_r$ and capacitor $32'''_c$ values. Once the time or number of rings programmed at 32 is over, this latter shall activate, through its output, the input of programmable timer $33''_r$, which can be adjusted by means of variable resistor $3''$ and capacitor $33'''_c$. In our case, the activation time has been adjusted in 30 seconds: we shall explain why. Once timer 22 has been activated, this latter, through its output $33''''$, activates relay C, which, through its normally open contacts C', now closed, couples the phone line to the primary of transformer 4A through junction points A' and B', thus closing the d.c. current or attention circuit. At the same time, output $33''''$ of timer 33 activates the input of synthesized voice announcer 35, which couples the voice announcement to the phone line through its output in turn connected to the secondary of said transformer 4A. The voice announcement stored at circuit 35 has a time duration of, e.g., 15 seconds. As form the moment the voice announcement is over, the calling party shall have at least 15 additional seconds to emit the code which has been indicated to him. Such code can be sent, depending on the specific case, under the form of Touch-Tone signals, rotary pulses, phonemes, etc.

The signals emitted by the calling party are coupled to decoder 36 through its input 6' and the signals, e.g., binary type logic signals, present at its output in response to the analog signals at its input, are coupled to the inputs of memories 37 and 38 respectively. If the signals emitted by the calling party correspond to the code programmed or stored in memory 37, which is destinated to phone answering machine (CTA) activation , and have been correctly entered and decoded, output 37" of memory 37 shall apply a re-activation signal to timer 33 through its input $33'''''$, whereby timer 33 shall observe an additional 30 seconds time.

From that moment on, we must consider that the apparatus shall begin to activate the phone answering machine (CTA) and the selected 30 seconds time is considered enough as to produce the activation of a current phone answering machine (CTA) in the market or of any automatic call attention phone device.

We shall see now how the CTA is activated in this case: in memory 37 the code intended to activate the phone answering machine is programmed, such code having been announced to the calling party by means of the announcement stored in voice synthesizer 35. Once said code has been accepted or validated by memory 37, this latter shall produce at its output 37''' a signal with a cadence similar to that generated by a phone exchange when activating the ring bell of a common phone set. This signal shall be coupled through diode 10D to phone call relay D, and, simultaneously, through diode 11D, to phone call selector transfer relay E. The closing, with the above mentioned cadence, of contacts D" and D''' of relay D and that of contacts E' and E" of relay E shall produce the conduction of phone call a.c. current pulses towards the phone answering machine (CTA) which is connected to the apparatus in series with relay G. Simultaneously, contact D' of phone call relay D, which is also operated with the same cadence as that generated by 37, sends an activation signal to the input of ring-back generator 39 which, through its output, which is coupled to the secondary of transformer 4A, indicates to the calling party that the phone answering machine (CTA) is in the activation process.

What has been explained relates to the case wherein the calling party willing to leave a recorded message follows the instructions of the synthesized voice announcement.

As soon as the phone answering machine (CTA) answers the artificial phone call, thus closing its d.c. current or attention circuit, the current flow through relay G shall produce the closing of contacts G', and, therefore, the activation of transfer relay F, which shall in turn produce the change of its contacts F' and F", which, by means of contacts A" and B", couple the phone line, thus establishing the conference between the calling party and the phone answering machine (CTA).

Simultaneously with the closing of contacts G' of relay G, a signal shall be sent through diode 14D to input $33''''''$ of timer 33, producing the reset thereof and thus, the de-activation of the d.c. current closing or attention circuit C, uncoupling the phone line from the apparatus, therefore allowing the conference between the calling party and the phone answering machine (CTA)

A calling party familiar with the system and with the codes assigned to the respective automatic call attention phone devices, after having received the synthesized voice announcement, shall simply emit one of the codes corresponding to said automatic call attention phone devices. This means that he shall ignore the voice synthesized invitation and shall directly emit the code corresponding, in the present case, to the equipment indicated in the figure with EATA, this code being programmed in memory 38. With respect to the additional switching circuit, this is exactly identical to the previously described one. In this case, we observe that the artificial call system sending the a.c. current pulses comprises just one relay (only one circuit), which, through the corresponding diode, selects the CTA (phone answering machine or EATA (automatic call attention phone device), depending on the particular case. It is also possible to add to the present embodiment, the phone line polarity reverse, dialling tone or busy tone detector, so that if the calling party gives up the communication at any stage of the process, the corresponding reset shall take place.

On the other hand, if the calling party does not emit the correct code within the time period of 15 seconds offered by timer 33, tries to enter aleatory codes, or does not complete the codes, then timer 33, not receiving the re-activation signal from the corresponding memory at its input $33'''''$, and once finished to 30 seconds timer period, shall release the d.c. current closing relay C, thus disconnecting the apparatus from the phone line.

The experts in the art will easily understand that variations or substitutions can be performed on the specified circuits arrangements, as on some components, which notwithstanding, shall be comprised within the spirit and scope of the present invention, as defined in the annexed claims.

What is claimed is:

1. Method for activating with a phone telecommand an announcer-recorder and for selectively activating by sending codes consisting of signals at least another automatic call attention phone device to provide remote control functions, wherein the method comprises the following steps:

(A) sending from the calling end of a phone line the characters corresponding to the called phone number;

(B) detecting at the called end of the phone line the call trains coming from the phone exchange;

(C) closing the d.c. current conversation circuit over the phone line and coupling thereto a voice synthesizer having a stored announcement therein inviting the calling party to send a certain code to leave a recorded message;

(D) after the calling party sends said certain code, decoding said certain code at the called party's end, and, if from a comparison with a code stored in the memory, both codes coincide, generating an artificial call trains designated to activate a phone answering machine;

(E) simultaneously sending to the calling party ring-back signals to advise that said certain code has been validated and that a phone answering machine is activated;

(F) after activation of said phone answering machine, the calling party emits a message over said circuit, which is recorded by said phone answering machine;

(G) simultaneous with the initiation of step F, sending a reset pulse to the phone telecommanded activation device, and,;

(H) after completion of step F, disconnecting the phone answering machine from the phone line.

2. The method of claim 1, wherein, after completing steps A, B and C;

(D') after said certain code is sent by the calling party and decoded at the called party's end, and after finding coincidence of the two codes, emitting an audible signal over the phone line in order to advise the calling party to leave a recorded message;

(E') simultaneously coupling to the phone line a sound recorder;

(F') sending a ring-back signal to the calling party in order to inform him that recording time is over, and,;

(G') sending a reset pulse to the phone telecommanded activation device, de-activating and disconnecting from the phone line said sound recorder.

3. The method of claim 1, wherein, after completion of steps (A), (B) and (C);

D' emitting from the calling party's end a code different from said certain code, decoding it at the called party's end, and, if from a comparison with other codes stored in said memory, said different code proves to be one of the stored codes, generating another artificial call trains designated to activate an automatic call attention phone device;

(E') simultaneously sending to the calling party ring-back signals to advise him that said different code has been validated and that an automatic call attention phone device for remote control command is being actived;

(F') thereafter, the calling party sending the corresponding code for activating said automatic call attention phone device;

(G') simultaneous with the initiation of step F', sending a reset pulse to the phone telecommanded activation device.

4. Apparatus for activating through phone telecommand an announcer-recorder and for selectively activating through the sending or emission of codes consisting of signals at least another automatic call attention phone device, the apparatus comprising:

a pair of terminals capable of being connected to the phone line;

a ring bell or call trains detector coupled to said pair of terminals;

a timer means for regulating the detection of a whole number of ringings or call trains;

at least one phone line coupler transfer switch means having a first input coupled to said pairs of terminals for connection to said automatic call attention phone device;

a phone line polarity reverse, dialing tone or busy tone detector coupled to said pair of terminals;

a voice synthesizer means having an output coupled to said pair of terminals;

a memory having one output coupled to said pair of terminals;

a d.c. current closing or attention circuit having a first input coupled to said ring bell or call trains detector via said timer means, and having a second input;

said d.c. current closing or attention circuit having a first output connected to the input of said voice synthesizer and having a second output;

a decoder coupled to said second output of said d.c. current closing or attention circuit and having an output connected to the input of said memory;

said memory having another output connected to said second input of said d.c. current closing or attention circuit and having a further output;

an artificial call trains generator having an input coupled to said further output of said memory;

said phone line coupler transfer switch having a second input coupled to the output of said artificial call trains generator and having a first and a second output;

a phone answering machine having a input coupled to said first output of said phone line coupler transfer switch;

said second output of said phone line coupler transfer switch connected to said second input of said d.c. current closing or attention circuit; and, said phone line polarity reverse, dialing tone or busy tone detector having an output connected to said second input of said d.c. current closing or attention circuit.

5. The apparatus for phone telecommanded activation of an announcer-recorder and for selectively activating, through the sending or emission of codes consisting or signals, an automatic call attention phone device comprising:

a pair of terminals capable of being connected to a phone line carrying said codes and in turn connected to:

an input of a ring bell or call trains detector having a timer means for regulating the detection of a whole number of rings or call trains, a first input of a first phone line coupler transfer switch, an input of a phone line polarity reverse, dialling tone or busy tone detector, an output of a voice synthesizer, a first and a second output of a memory, and, a first input of a second phone line coupler transfer switch;

said ring bell or call trains detector connected to a first input of a d.c. current closing or attention circuit;

said d.c. current closing or attention circuit having a first output connected to an input of said voice synthesizer and a second output connected to an input of a decoder;

said decoder having an output connected to an input of said memory;

said memory in turn having:

a third output connected to a second input of said d.c. current closing or attention circuit, a fourth output connected to a second input of said first phone line coupler transfer switch, and a fifth output connected to an input of an artificial call trains generator;

said artificial call trains generator having an output connected to a second input of said second phone line coupler transfer switch;

said first and second phone line coupler transfer switches having respective outputs to be respectively connected to a sound recorder and to said automatic call attention phone device;

said phone line polarity reverse, dialling tone or busy tone detector having an output connected to said second input of said d.c. current closing or attention circuit.

6. The apparatus for phone telecommanded activation of an announcer-recorder and for selectively activating, through the sending or emission of codes consisting of signals, an automatic call attention phone device comprising:

a pair of terminals capable of being connected to a phone line carrying said codes;

a ring bell or call trains detector coupled to said terminals;

a call trains counter coupled to said detector;

an adjustable timer coupled to said counter;

a voice synthesizer coupled to said timer;

a first relay having one end of a winding thereof coupled to said timer and the other winding end connected to a power supply;

a transformer with three windings, one end of a first transformer winding being connected to the output of said voice synthesizer;

an artificial call trains generator having an output connected to said one end of said first transformer winding;

a decoder;

a second transformer winding having one end connected to an input of said decoder;

said first and second transformer windings having their other ends ground-connected;

a third transformer winding having one end connected to a terminal of said pair of terminals and the other end, through a pair of first relay contacts of said first relay, to the other terminal of said pair of terminals thereby providing connection to said phone line;

said pair of first relay contacts having the capacity of being activated through the winding of said first relay;

a first and a second programmable memory both having inputs coupled to the output of said decoder;

said adjustable timer having a second input coupled via a diode to a first output of said memories;

said first and second memories having a second output, each one of them connected through a respective additional diode to the winding end of:

a second, a third and a fourth relay;

the other wind end of said second, third and fourth relays being ground-connected;

said winding of said second relay with three pairs of contacts capable of being activated, a first pair being intended to supply power to said artificial call trans generator, a second pair being connected to the output of said artificial call trains generator and the third pair being connected to a respective first and second pair of contacts activated by the third and fourth windings of said third and fourth relays;

a fifth and a sixth windings belonging to a fifth and a sixth relay having one end of said fifth and sixth windings ground-connected and the other end, through respective further diodes, respectively connected to a second output of said timer and to respective third outputs of said memories, said windings of said fifth and sixth relays having each one of them a pair of transfer contacts capable of being activated;

a seventh relay having a winding coupled to the transfer contacts of said fifth relay;

a pair of terminals for connecting a phone answering machine coupled through said seventh relay to said fifth relay;

the transfer contacts of the sixth relay being connected through the winding of an eighth relay to a pair of terminals for connecting an automatic call attention phone device;

the respective first closed contacts of said fifth and sixth relays respectively connected to the first and second pair of contacts of said third and fourth relays;

said seventh and eighth relays having one pair of contacts each, with one end connected to the power supply and the other end, through respective other diodes, connected to said second outputs of said memories;

the respective second closed contacts of said fifth and sixth relays respectively connected to said pair of terminals.

7. The apparatus for phone telecommanded activation of claim 4, wherein said ring bell or call trains detector has a gaseous lamp connected in series with a first limiter resistor, said gaseous lamp being optocoupled to a photoresistor which is connected between the power supply and the ground through a second resistor; the junction point between said photoresistor and said resistor constituting the output of said detector.

8. The apparatus for phone telecommanded activation of claim 4, wherein said transfer switch comprises a relay with at least one set of transfer contacts.

9. The apparatus for phone telecommanded activation of claim 4, wherein said memory is a microprocessor.

10. The apparatus for phone telecommanded activation of claim 4, wherein said memory is a plug-in unit.

* * * * *